United States Patent [19]
Kawai et al.

[11] Patent Number: 5,128,527
[45] Date of Patent: Jul. 7, 1992

[54] APPARATUS FOR READING A BAR CODE

[75] Inventors: Hiroaki Kawai, Yokohama; Shinichi Sato, Kawasaki, both of Japan

[73] Assignee: Fujitsu Limited, Japan

[21] Appl. No.: 501,987

[22] Filed: Mar. 29, 1990

[30] Foreign Application Priority Data

Mar. 29, 1989 [JP] Japan .................................. 1-79379

[51] Int. Cl.⁵ .............................................. G06K 7/10
[52] U.S. Cl. .................................. 235/462; 235/463; 235/494
[58] Field of Search ............. 235/462, 463, 466, 470, 235/494, 472; 250/566, 568

[56] References Cited

U.S. PATENT DOCUMENTS

| 4,056,710 | 11/1977 | Shepardson et al. | 235/463 X |
| 4,075,461 | 2/1978 | Wu et al. | 235/466 |
| 4,272,675 | 6/1981 | Blarford et al. | 235/463 |
| 4,354,101 | 10/1982 | Hester et al. | 235/463 |
| 4,656,345 | 4/1987 | Kurimoto | 235/472 |
| 4,717,818 | 1/1988 | Broockman et al. | 235/463 |

FOREIGN PATENT DOCUMENTS

186069 10/1984 Japan .

Primary Examiner—Stuart S. Levy
Assistant Examiner—Joseph A. Rhoa
Attorney, Agent, or Firm—Nikaido, Marmelstein, Murray & Oram

[57] ABSTRACT

A second bar code such as an add-on code which comprises only a character bar and is added to the side of the first bar code such as UPC, EAN and JAN which has a center bar and guard bar can be correctly read out. When the scanning is made from the first bar code side to the second bar code side, a write address produced when the right guard bar of the first bar code is recognized is used to access the data of the second bar code. Conversely, where the scanning is made from the second bar code side to the first bar code side, the write address produced when the center bar of the first bar code is recognized is used to access the second bar code after an arithmetic operation. Therefore, the first bar code can be clearly distinguished from the second bar code which is different in bar code system and the second bar code can be correctly read out.

11 Claims, 6 Drawing Sheets

Fig. 6

APPARATUS FOR READING A BAR CODE

The present invention relates to a method of reading a bar code and an apparatus for performing the method, the apparatus being capable of reading a bar code, where a bar code such as an add-on code is added to the side of another bar code such as a UPC (universal product code), the add-on code being different from the UPC in the bar code system.

A label on which a bar code is printed is attached to an article to be processed in a POS system (a point of sales processing system) of a data processing system. The bar code is printed on the label, together with data necessary for sales processing of the article. Upon selling the article, the label is read out by moving it across a bar code scanner a predetermined distance from it, and data obtained by decoding a read out bar code signal is used for sales processing of the article.

In a conventional POS system, a kind of bar code of only one bar code system is printed on a label attached to an article. Sometimes, for convenience, a sheet or a plurality of sheets of bar coded labels is attached to an article, but these labels belong to the same bar code system. Therefore, the system for reading the bar code in this kind of POS system is also formed such that only a bar code of the same bar code system can be read out. For example, widely-used bar codes such as UPC, EAN (Europe article numbering), JAN (Japan article numbering) are formed such that bar code blocks are provided on the right and left sides of a center bar provided between these bar code blocks and that left and right guard bars are provided outside the respective bar code blocks. Therefore, in a conventional bar code reading system, when reading, a discretional single scanning line must pass the center bar and either left or right, guard bar and by, recognizing the two kinds of bars (the center bar and guard the bar) for detection, a character bar code of a bar code block provided between the two kinds of bars (namely, the center bar and the guard bar) can be decoded correctly.

In some fields, articles having two kinds of bar codes printed on a label are used in the POS system by adding another bar code such as an add-on code. This add-on code which does not have a center bar and a guard bar, but is formed of only a character bars, is added to the side of the bar code formed of a center bar, left and right guard bars and left and right bar code blocks, the two kinds of bar codes being different in respect of a bar code system. For example, a label attached to a magazine, for example, may use an ordinary bar code such as UPC to represent fixed data such as the magazine title, and an add-on code to represent data such as months and volumes of magazines, which are usually changing.

In such a case, if a bar code reading system necessitating a recognition of a center bar and a guard bar is used tried to read a bar code formed by a bar code system which does not have a center bar and guard bar, it would be unable for such a bar code reading system to correctly decode the information provided by the bar code from the bar code signal obtained by scanning the bar code data which does not have the center and guard bars.

SUMMARY OF THE INVENTION

An object of the present invention is to provide a method of reading a bar code and an apparatus for performing the method, the apparatus correctly reading a bar code label having a bar code without a center bar and guard bar added to the side of another bar code with a center bar and guard bar, the two bar codes being of different bar code systems.

A feature of the present invention resides in an apparatus for reading bar code data from a bar code label containing a first bar code having a center bar between left and right bar code blocks and having guard bars on the left edge of the left bar code block and on the right edge of the right bar code block, and a second bar code provided next to the guard bar attached to the right edge of the right bar code block, said second bar code being different from the first bar code in respect of a bar code system, the bar code label being scanned from the first bar code side to the second bar code side and the data of the bar code which is read out upon scanning is sequentially stored and the guard bar on the right edge of the right bar code block is recognized during storing of the data read from the bar code and the address for storing of the right edge guard bar of the right bar code block is used for access to stored data of the second bar code.

DETAILED DESCRIPTION OF THE EMBODIMENT

The firs principle of operation utilizes a bar code label comprising a first bar code having a center bar between the left and right bar code blocks and a guard bar on the left edge of the left bar code block and on the right edge of the right bar code block, and a second bar code provided next to the guard bar attached to the right edge of the right bar code block and different from the first bar code in respect of the bar code system. This principle operates when the bar code label is scanned from the first bar code side to the second bar code side and the data of the bar code thus read out is sequentially stored and the guard bar on the right edge of the right bar code block is recognized during storing of the data read from the bar code and the address for storing the right edge guard bar of the right bar code block is used for access to stored data of the second bar code.

The second principle of operation utilizes a bar code label comprising a first bar code having a center bar between the left and right bar code blocks and a guard bar on the left edge of the left bar code block and on the right edge of the right bar code block, and a second bar code provided next to a guard bar attached to the right edge of the right bar code block and different in a bar code system from the, first bar code. This principle operates when the bar code label is scanned from the second bar code side to the first bar code side and the data of the bar code thus read out is sequentially stored. A center bar appearing during storing of the data of the bar code is recognized and an address for storing the data of the center bar upon recognition is used for an access to stored data of the second bar code.

Figure 1:
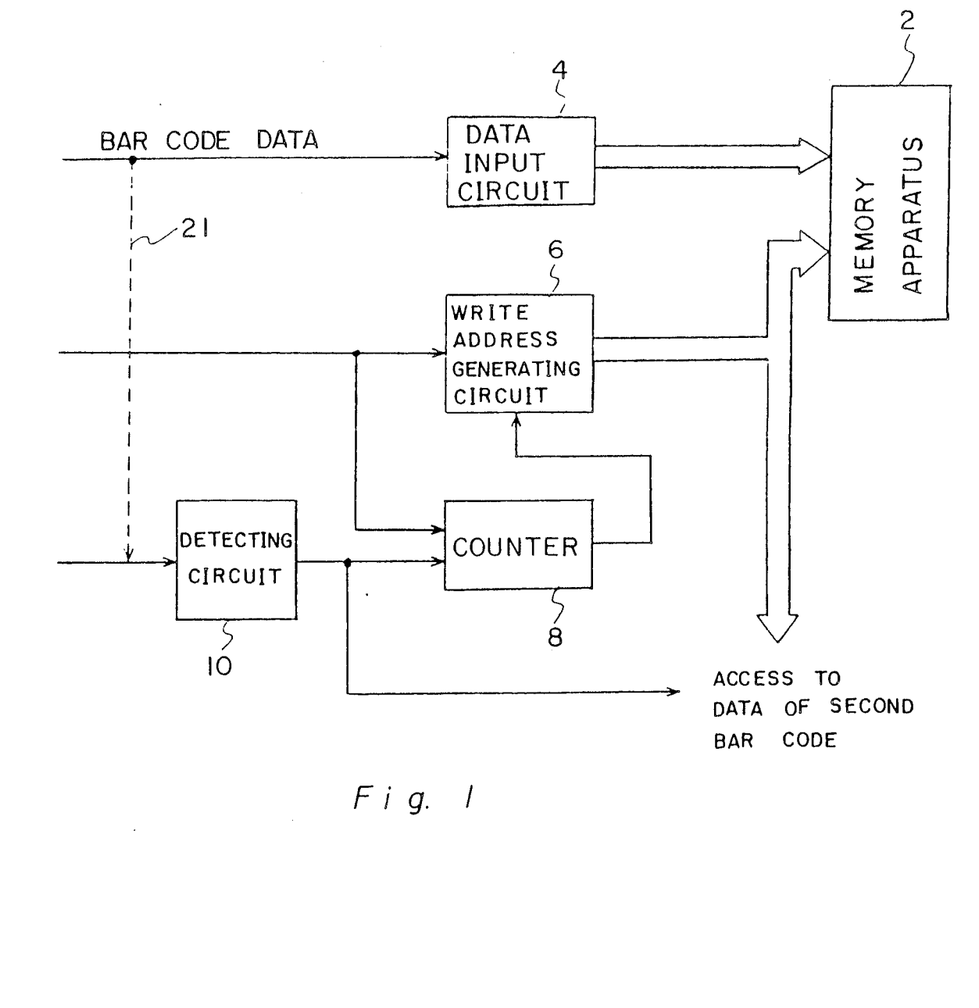
FIG. 1 is a block diagram showing a principle of the present invention.

The embodiment as shown in FIG. 1, comprises memory apparatus 2, data input circuit 4, write address generator 6, and a detecting circuit 10. Data input circuit 4 is for inputting bar code data in memory apparatus 2, write address generator 6 is for sequentially generating an address for writing the bar code data in memory apparatus 2 in response to a bar code signal outputted in accordance with a scan of widths of respective white and black bars of the bar code when the signal indicates a change between white bar and a black bar a signal from counter 8 is outputted when there is a transition between white ba and black bar and detecting circuit 10 is for reading the guard bar on the right edge of the right bar code block in a first bar code when the bar code is read from the first bar code side to the second bar code side. An address output from write address generating circuit 6 in response to the output of detecting circuit 10 is used for a data access of the second bar code stored in memory apparatus 2.

Figure 2:
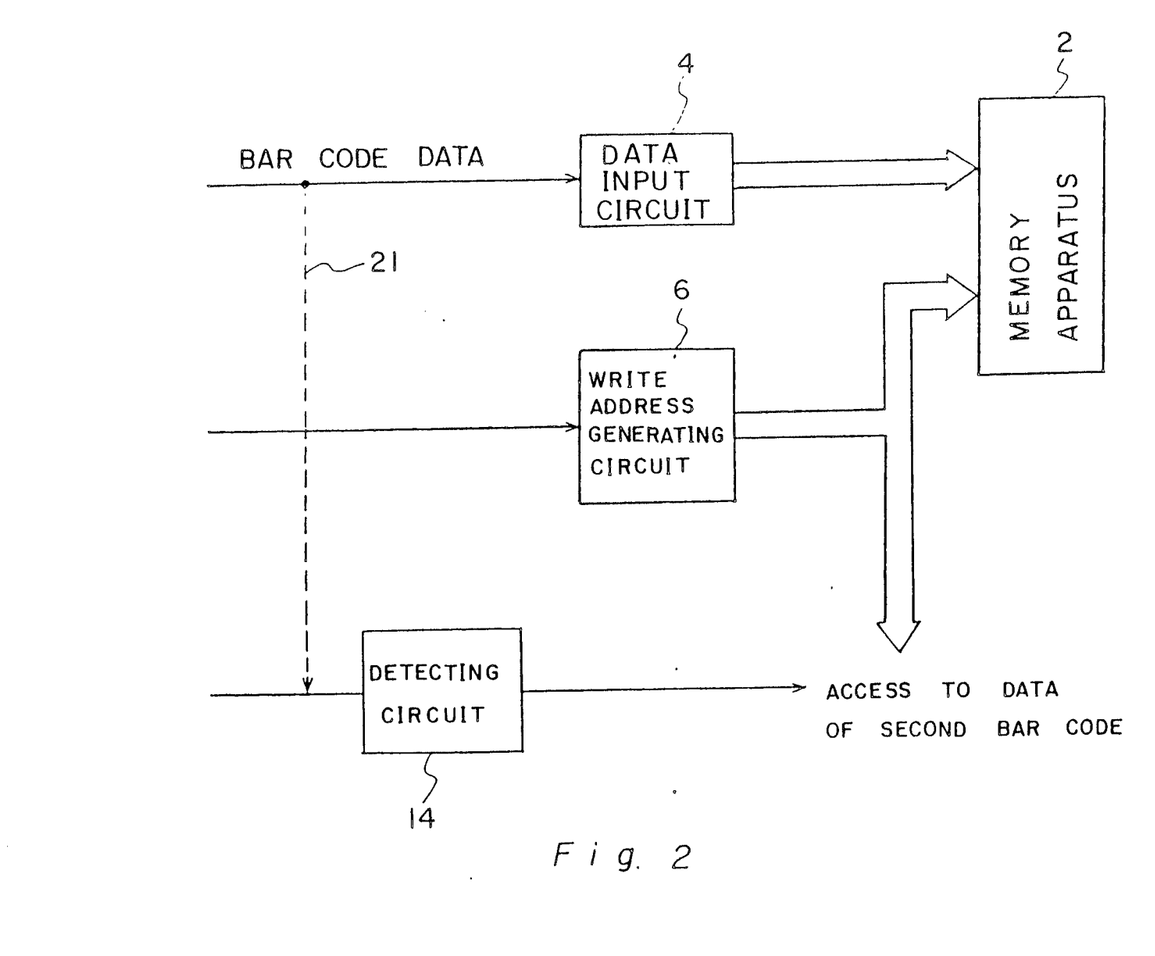
FIG. 2 is a block diagram showing another principle of the present invention.

The fourth embodiment, as shown in FIG. 2, comprises memory apparatus 2, data input circuit 4, write address generator 6, and detecting circuit 14. Data input circuit 4 is for inputting bar code data in the memory apparatus 2 and write address generator 6 is for sequentially generating an address for writing the bar code data in memory apparatus 2 in response to a signal outputted when a transition occurs between a white bar and a black bar, in accordance with a scan of the bar code. Detecting circuit 14 is for detecting a reading of a center bar of the first bar code when the data is read from the second bar code side to the first bar code side. An address output from write address generating circuit 6 in response to the output of detecting circuit 14 is used for an access of data of the second bar code stored in memory apparatus 2. In this case, more concretely, an address obtained by subtracting an address value of the right code block of the first bar code from the address of the counter bar output from write address generating circuit 6 in response to the output of detecting circuit 14 is used as a final address of the data of the second bar code stored in memory apparatus 2.

Counter 8 in FIG. 1 is not always necessary and a counter corresponding to counter 8 in FIG. 1 may be used in a circuit shown in FIG. 2.

Detecting circuits 10 and 14 may be formed of a circuit for detecting a reading of either a center bar or a guard bar in accordance with the direction of scanning upon reading the data. The circuit judges whether the data is scanned for reading from the first bar code side to the second bar code side or from the second bar code side to the first bar code side. In the former case, the circuit detects a reading of the guard bar on the right edge of the right bar code block within the first bar code to produce a guard bar recognition signal. In the latter case, the circuit reads a center bar of the first bar code to output a center bar recognition signal.

The bar code data obtained by a scanning from the first bar code side to the second bar code side or by a scanning in the opposite direction is written in the memory location of memory apparatus 2 designated by a write address corresponding to the bar code data generated by write address generating circuit 6. The write address of write address generating circuit 6 is generated in response to a signal output when a transition occurs between a white bar and a black bar.

When a right side guard bar of the right bar code block is detected upon scanning the data from the first bar code side to the second bar code side an address generated from write address generating circuit 6 in response to a detection of the right side guard bar is used to read the data of the second bar code written in memory apparatus 2. Therefore, in addition to the first bar code, the second bar code, which is of a different bar code system from the first bar code, can be correctly read.

When the center bar is detected by detecting circuit 14 upon scanning the data in an opposite direction, an address produced by address generating circuit 6 in response to the detection of the center bar is used to read the second bar code of the bar code data written in memory apparatus 2. Therefore, when the scanning is performed in an opposite direction, the second bar code can be correctly read out and distinguished from the first bar code.

Figure 3:
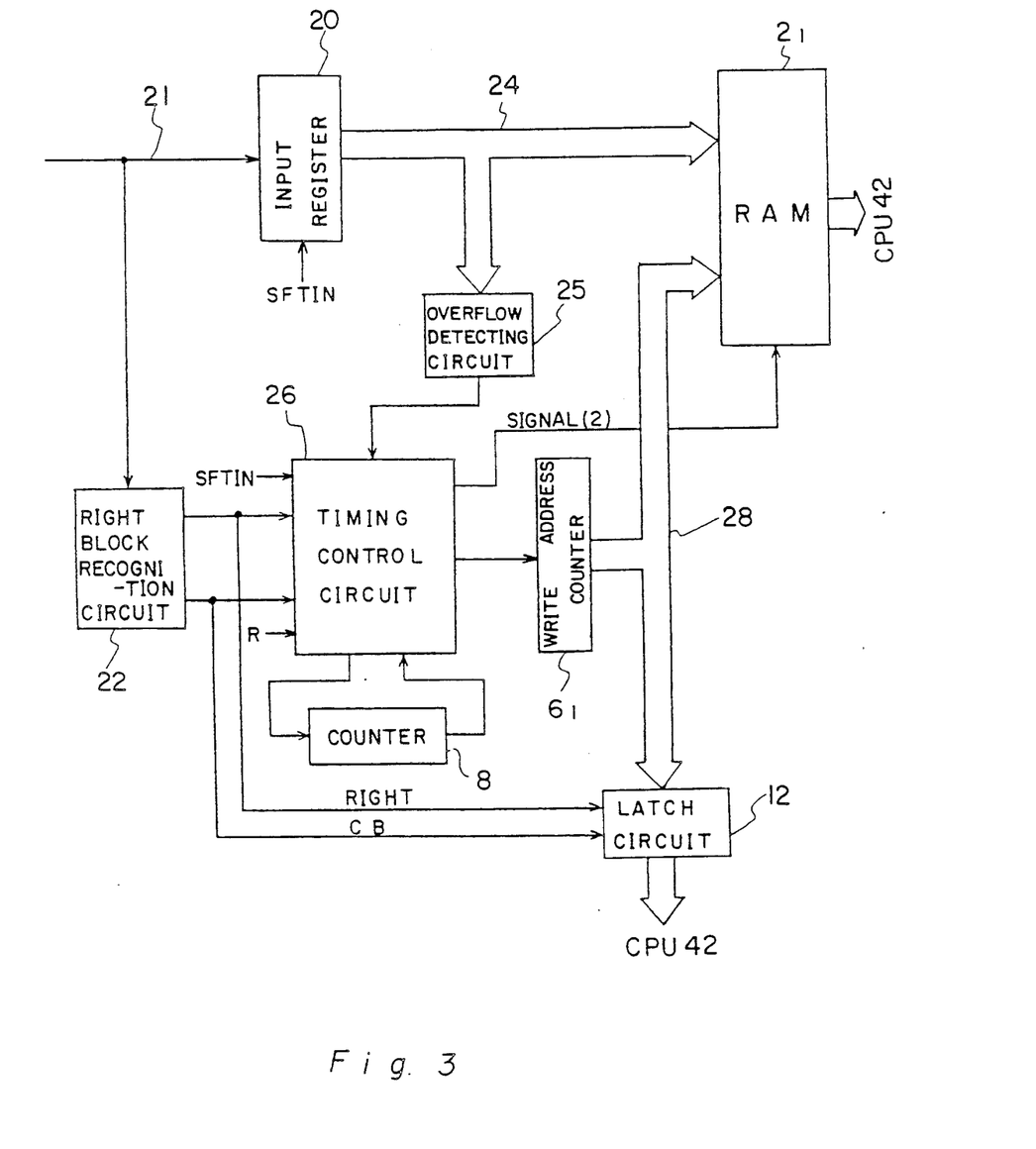
FIG. 3 shows a block diagram of an embodiment of the present invention.

FIG. 3 shows a block diagram of an embodiment of the bar code reading apparatus according to the present invention incorporating the principles of FIGS. 1 and 2, and the present embodiment makes it possible to read an add-on code added to the side of UPC. Although not shown in FIG. 3, means (a bar code scanner) for optically scanning and reading a bar code, an A/D converter for converting the output of the scanning means, and a bar width counter for counting the bar width of the bar code based on the A/D converter are provided. The output of the bar width counter is applied to bar code data input line 21 shown in FIG. 3. In FIG. 3, bar code data input line 21 is connected to input register 20 and right block recognition circuit 22. Input register 20 is connected to RAM 21 and overflow detecting circuit 25 through right data bus 24. A writing and reading of RAM 21 is performed under the control of a later described CPU 42 (shown in FIG. 5). Right block recognition circuit 22 outputs right block recognition signal RIGHT designating that all the right block of the UPC forming the first bar code and the center bar recognition signal CB designating that the center bar of the UPC are recognized, based on the bar code data, as described in detail later. Timing control circuit 26, as described in detail later, receives right block recognition signal RIGHT, center bar recognition signal CB, SFPIN signal outputted when the bar code signal output from an A/D converter circuit is changed from white to black or from black to white, a signal from overflow detecting circuit 25, a signal from counter 8 and a reset signal R outputted from CPU 42, and produces write enable signal (signal (2)) which is applied to a RAM $2_1$ and a count control signal which is applied to counter 8 and a write address counter $6_1$. The output of write address counter $6_1$ is connected to RAM $2_1$ and latch circuit 12 through write address bus 28. Latch circuit 12 receives right block recognition signal RIGHT at a set control input.

Input register 20 corresponds to data input circuit 4 shown in FIGS. 1 and 2. Write address counter 61 corresponds to write address generating circuit 6 shown in FIGS. 1 and 2. RAM 21 corresponds to memory apparatus 2 shown in FIGS. 1 and 2. Right block recognition circuit 22, inverter 36 and AND circuit 38 in timing control circuit 26 (see FIG. 5) correspond to detecting circuit 10 shown in FIG. 1 and right block recognition circuit 22 corresponds to detecting circuit 14 in FIG. 2.

Figure 4:
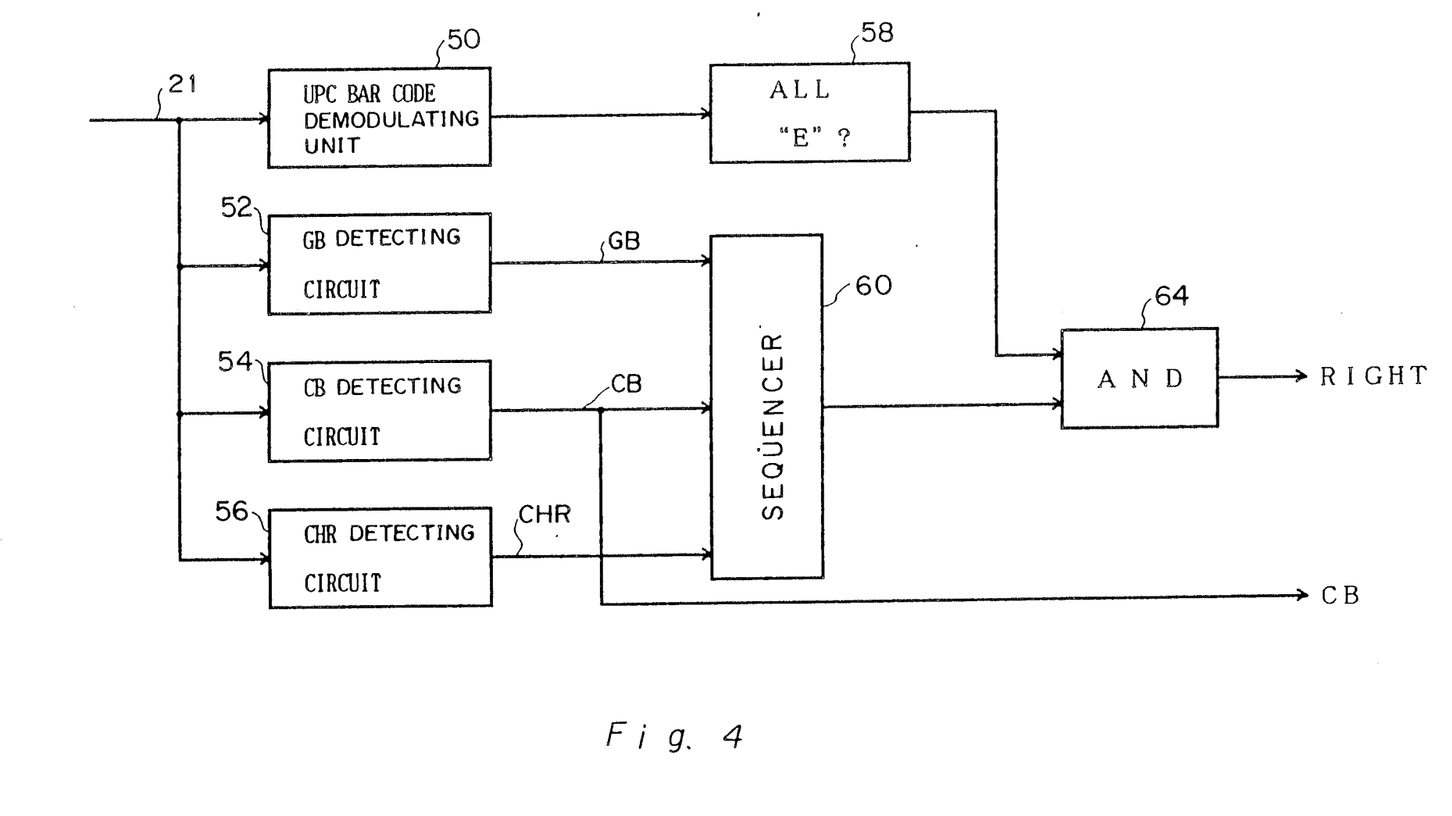
FIG. 4 shows a detailed block diagram of the right block recognizing circuit of the .first embodiment shown in FIG. 3.

As shown in FIG. 4, right block recognition circuit 22 comprises UPC bar code demodulating unit 50, GB (guard bar) detecting circuit 52, CB (center bar) detecting circuit 54, CHR (character) detecting circuit 56, even structure judging circuit 58, sequencer 60 and AND circuit 64. UPC bar code demodulating unit 50 produces binary demodulated data from bar code data with two values.

GB detecting circuit 52, CB detecting circuit 54, and CHR detecting circuit 56 detect a guard bar, center bar and a character bar from bar code data and respectively output a guard bar recognition signal GB, center bar recognition signal CB and character recognition circuit CHR which are at H level. Even structure judgment circuit 58 judges whether or not all the characters in the right block of the bar code are formed of an even structure. Sequencer 60 judges the normality of a sequence of a guard bar, center bar and character included in bar code data based on the outputs of GB detecting circuit 52, CB detecting circuit 54 and CHR detecting circuit 56. AND circuit 64 outputs right block recognition signal RIGHT of H level when the sequence is judged as being normal by sequencer 60 and the bar code data is determined as being formed of an even structure by even structure judgment circuit 58. AND circuit 64 outputs the right block recognition circuit RIGHT of an H level.

Figure 5:
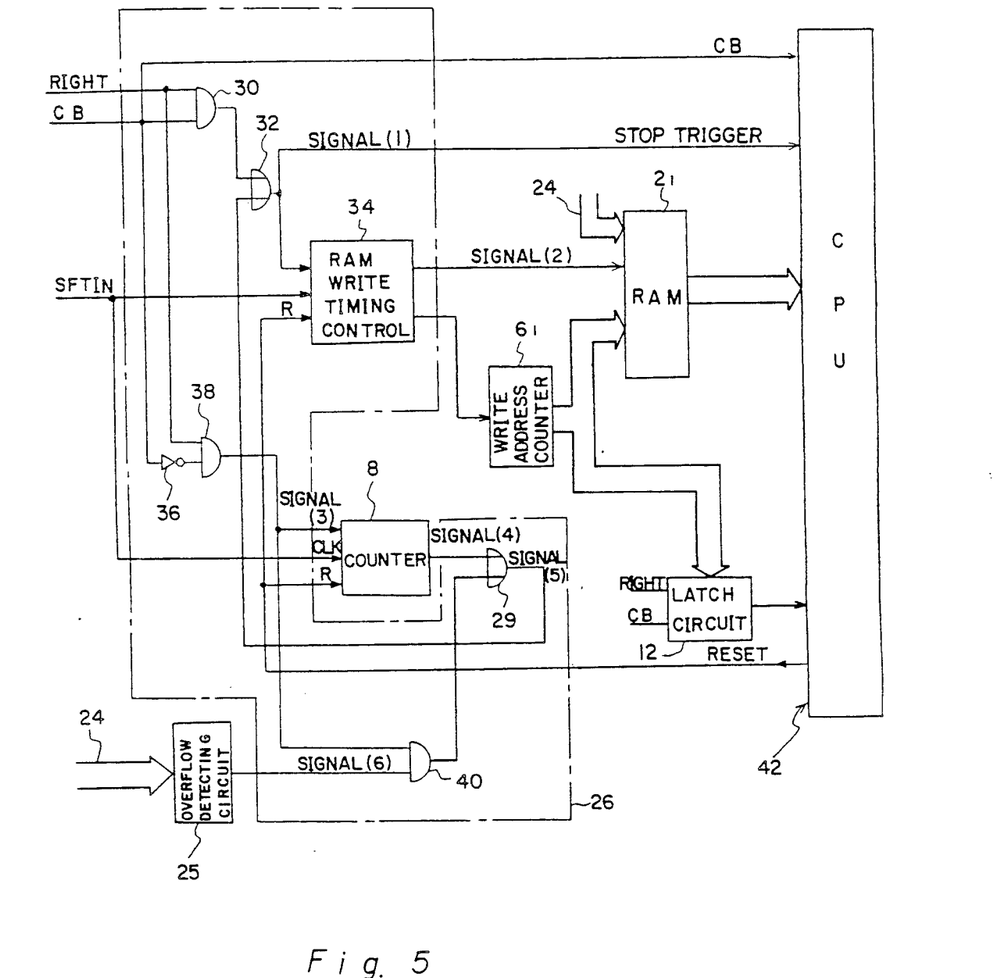
FIG. 5 shows a detailed block diagram of the timing control circuit shown in FIG. 3.

Timing control circuit 26, shown in FIG. 5, comprises AND circuit 30, OR circuit 29, OR circuit 32, timing control circuit 34, AND circuit 38, and AND circuit 40. AND circuit 30 is for receiving right block recognition circuit signal RIGHT and a center bar recognition signal CB. OR circuit 32 is for receiving the outputs of AND circuit 30 and OR circuit 29. Timing control circuit 34 is for receiving the output of OR circuit 32, the SFTIN signal, and a reset signal R from the CPU 42. AND circuit 38 is for receiving right block recognition signal RIGHT and center bar recognition signal CB from inverter 36. AND circuit 40 is for receiving the outputs of AND circuit 38 and overflow detecting circuit 25. The output of AND circuit 40 is connected to the input of OR circuit 29. RAM write timing control circuit 34 outputs write enable signal (signal (2)) for RAM $2_1$ and a count control signal for write address counter $6_1$. The output signal (3) from AND circuit 38 and the SFTIN signal are supplied to counter 8 as a count control signal. Center bar recognition signal CB is applied to CPU 42 and the output signal (1) of OR circuit 32 is applied to RAM write timing control circuit 34 and CPU 42 as a stop trigger signal. Counter 8 receives an output from AND circuit 38, the SFTIN signal and a reset signal from the CPU 42.

An operation of the apparatus with the above circuit structure according to the present invention will be explained by referring to FIGS. 3 to 5.

After an analog signal obtained by optically scanning the bar code using a bar code scanner is converted to a digital bar code signal by an A/D converter circuit (not shown), the widths of respective white and black bars of the bar code based on the bar code signal are determined by a bar width counter (not shown). The count value is input to input register 20 and right block recognition circuit 22 through bar code data input line 21 as bar code data, as shown in FIG. 3. At this time, the bar code data is written into input register 20 in accordance with a SFTIN signal outputted when the bar code undergoes a transition from white to black or from black to white and is outputted as bit parallel data from input register 20. This parallel data is transmitted to RAM $2_1$ through write data bus 24 and in addition is applied to overflow detecting circuit 25. The bit parallel data to be applied to RAM $2_1$ is written into the address of RAM $2_1$ which is provided from address counter 61 through write address bus 28. The address is produced as follows.

In FIG. 5, before the bar code data is input through bar code data input line 21, CPU 42 resets RAM write timing control circuit 34 and counter 8. The reading of the bar code on the label attached to the article then starts, using the bar code scanner. The SFTIN signal is input to RAM write timing control circuit 34. Until the stop trigger signal of the output signal (1) of OR circuit 32 is input to RAM write timing control circuit 34, RAM write timing control circuit 34 sequentially transmits a counter-up signal to write address counter $6_1$ in accordance with the SFTIN signal. Write address counter $6_1$ performs a counting operation in accordance with the counter signal, and sequentially produces a write address corresponding to the data provided to RAM $2_1$ from input register 20 through write data bus 24. That is, the count value of counter $6_1$ constitutes an address and the data output from input register 20 is sequentially written in a write allocation of RAM $2_1$ which is designated by the address output from counter $6_1$.

An operation of the circuit differs depending on the direction in which the bar code is scanned to provide the data to be written into RAM $2_1$ Three cases will be explained. In the first case, the scanning direction of the bar code is from the UPC side to the add-on code side (direction A in FIG. 6), in the second case the scanning direction of bar code is from the add-on code side to the UPC side (direction B in FIG. 6) in the opposite direction to the first case and in the third case the scanning deviates from the region of the bar code on the way of scanning the bar code label (direction C in FIG. 6).

Figure 6:
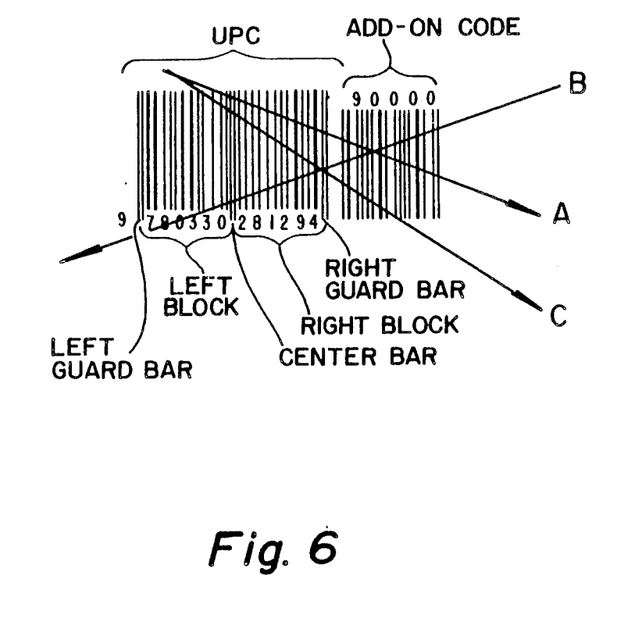
FIG. 6 shows an example of a bar code label comprising two bar codes of different bar code systems.

First, the case in which the bar code is scanned in the direction A in FIG. 6 is explained. In this case, when a center bar located at the central portion of the UPC is read out in the scanning direction, a center bar is detected by CB detecting circuit 54 in right block recognition circuit 22 shown in FIG. 4, thereby producing center bar recognition signal CB. Then, when a character bar in right block recognition circuit 22 of the UPC is read out, CHR detecting circuit 56 detects the character bar, to output character bar detecting signal CHR. When the scanning is moved further, and the right guard bar provided on the right edge of the UPC is read, GB detecting circuit 52 detects the guard bar, thereby producing guard bar recognition signal GB. Thus, sequencer 60 judges whether or not the above respective recognition signals CB,CHR and GB are outputted in a normal sequence and produces an H level signal where they are normal. On the other hand, even structure judgment circuit 58 in FIG. 4 judges whether or not the character bars read out by the scanner up to this time are of an even structure and outputs an H level signal when they are. Therefore, where a normal reading is performed from a central bar to the guard bar, the outputs of both sequencer 60 and even structure judgment circuit 58 become an H level and circuit 64 outputs right block recognition signal RIGHT designating that the right block of the UPC is correctly recognized. Therefore, where scanning is performed in direction A, right block recognition signal RIGHT is output at almost the same time as the guard bar recognition signal GB of GB detecting circuit 52. In accordance with right block recognition signal RIGHT outputted at almost the same time as the recognition of the guard bar, latch circuit 12 shown in FIG. 5 latches an address which is output from write address counter $6_1$ at the same time as the right block of recognition signal RIGHT.

On the other hand, when the right block recognition signal RIGHT is outputted, center, bar recognition signal CB has already been switched from H level to L level and thus the output of inverter 36 is changed to the high level in FIG. 5. Therefore, when right block recognition signal RIGHT is outputted, a count enable signal (signal (3)) of an H level is simultaneously supplied from AND circuit 38 to counter 8. Then counter 8 starts counting the SFTIN signal based on the count enable signal. The count value corresponds to the number of white and black bars already scanned in an add-on code. Thereafter, when the count value of counter 8 reaches a predetermined value corresponding to the total number of white and black bars of the add-on code, the counter outputs an H level signal (signal (4)) designating that all the readings of the add-on code are completed. This H level signal is provided to OR circuit 32 as an H level signal (signal (5)) through OR circuit 29. This H level signal (signal (5)) is provided to CPU 42 and RAM write timing control circuit 34 as the stop trigger signal (signal (1)) of an H level through OR circuit 32. The stop trigger signal stops writing the data into RAM $2_1$ through RAM write timing control circuit 34.

As described above, the data obtained by scanning the right block of the UPC and the add-on code is written in RAM $2_1$. CPU 42 gets an address latched in latch circuit 12 and accesses the data of the add-on code in RAM $2_1$ by using the above address, thereby decoding the data. As described above, the write address output from write address counter $6_1$ is latched at latch circuit 12 upon outputting right block recognition signal RIGHT (i.e., almost at the same time as the recognition of the right guard bar). Therefore, the latched address corresponds to the head address of the add-on code added immediately to the side of the right guard bar. By using this address, CPU 42 can distinguish the data of the add-on code from the data of the UPC and can thus correctly decode the data of the add-on code.

Next, the case where scanning is performed in direction B in FIG. 6 is explained. In this case, the add-on code is first read in the scanning direction. In accordance with the SFTIN signal generated in accordance with a scanning of the add-on code RAM, write timing control circuit 34 sequentially writes the data of the add-on code in RAM $2_1$. In this time period, write address counter $6_1$ sequentially outputs a write address in accordance with the SFTIN signal and sequentially writes the bar code data in the writing position of RAM $2_1$, which corresponds to the write address.

When the scanning of the add-on code is completed, reading of the UPC start First, when the right guard bar on the right edge of the UPC is read, the guard bar is detected by GB detecting circuit 52 in right block recognition circuit 22 shown in FIG. 4, thereby outputting the guard bar recognition signal GB. When characters of bars in the right block of the UPC are read, they are sequentially detected by CHR detecting circuit 56, thereby producing character bar detecting signal CHR. When the scanning further proceeds and the center bar of the UPC is read, the center bar is detected by CB detecting circuit 54, thereby producing center bar recognition signal CB. Next, sequencer 60 of the right block recognition circuit judges whether or not the respective recognition signals GB, CHR and CB are outputted in a normal sequence and when they are normal, the H level signal is outputted. Even structure judgment circuit 58 judges whether or not the character bars of the UPC read out by the scanning up to this time are of an even structure, and if they are, an H level signal is outputted. Where the bar code of the UPC is normally read from the right guard bar to the center bar, the outputs of sequencer 60 and even structure judgment circuit 58 become an H level and AND circuit 64 outputs the right block recognition signal RIGHT designating that the right block of the UPC is correctly recognized. Where the scanning is performed in direction recognition B, right block recognition signal RIGHT is outputted at almost the same time as center bar recognition signal CB by CB detecting circuit 54, unlike the case where the scanning is performed in direction A.

In accordance with the right block recognition signal RIGHT outputted at almost the same time as the recognition of the center bar, latch circuit 12 shown in FIG. 5 latches an address outputted from address 10 counter $6_1$ at the same time as the right block recognition signal RIGHT.

On the other hand, when right block recognition signal RIGHT and center bar recognition signal CB are output almost simultaneously, AND circuit 30 in FIG. 5 becomes an H level and the H level signal is supplied to CPU 42 and RAM timing control signal 34 as the stop trigger signal(signal(1)) through OR circuit 32. The stop trigger signal stops writing the data into RAM $2_1$ by using RAM timing control circuit 34. Where the scanning is performed in direction B, center bar recognition signal CB is not output and thus right block recognition signal RIGHT is not output and AND circuit 38 does not produce a count enable signal (signal(3)), thereby preventing a drive operation of counter 8.

As described above, the data of the add-on code and the right block of the UPC are written in RAM $2_1$. CPU 42 receives an address latched in latch circuit 12 and accesses the data of the add-on code in RAM$2_1$ by using this address and decodes the data. In this case, unlike the case where the scanning is performed in direction 1, the write address output from write address counter $6_1$ is latched in latch circuit 12 upon outputting the right block recognition signal RIGHT (at almost the same time as the recognition of the center bar) and thus the latched address value corresponds to the address value obtained by the adding an address value of the right block of the UPC to the final address of the add-on code. Therefore, where CPU42 judges, based on a timing of the center bar recognition signal CB to be input to CPU42, that the reading scanning is in direction 2 CPU42 subtracts the address value of the right block of UPC from the address latched in latch circuit 12 and uses the address value obtained through the subtraction as the final address of the add-on code. Therefore, CPU42 distinguishes the data of the add-on code written in RAM $2_1$ from the data of the UPC and can correctly decode the add-on code data.

Finally, the case where the bar code is scanned in direction C as shown in FIG. 6 is explained. This is the case where scanning is tried in direction A but is deviated from the region of the add-on code on the way of scanning the add-on code. In this case, before the scanning is deviated from the bar code area the same operation as for scanning in direction A is performed. However, read out bar code data is also provided to overflow detecting circuit 25 which always detects whether or not the bar width of the bar code data exceeds the bar width of the normal bar code data and whether or not the bar position relationship is in a predetermined configuration. When the scanning is deviated from the bar code area, as shown by the arrow C, overflow detecting circuit 25 detects the fact, and outputs an overflow detecting signal (signal (6)) of an H level. The output of the overflow detecting signal makes the output of AND circuit 40 at a high level and this H level signal is applied to CPU 42 and RAM write timing control circuit 34 as the stop trigger signal (signal (1)) through OR circuits 29 and 32. RAM write timing control circuit 34 stops further writing of data in RAM $2_1$ by using the stop trigger signal.

In the above embodiment, the count operation of the SFTIN signal by counter 8 can be performed by a soft counter provided in CPU 42. The above embodiment explains a case where an add-on code is attached to the right side of the UPC and the add-on code is read by one scanning and decoded. It is possible to read both the UPC and the add-on code in one scanning and to decode the output read from the UPC and the add-on code. In this case, the write address used upon recognizing the center bar or the guard bar is used to access the add-on code in the same way as in the above embodiment. Thus, the UPC and the add-on code can be distinguished and read correctly.

In addition to the embodiment comprising the UPC and the add-on code, the present invention can be applied to a combination comprising a first bar code such as EAN or JAN which has a center bar and a guard bar as the UPC may be combined with the second bar code of a different bar code system which does not have a center bar or a guard bar.

As is clear from the above description, according to the present invention, it is possible to read the second bar code such as an add-on code which comprises only a character bar and is added to the side of a first bar code such as UPC, EAN and JAN, which has a center and a guard bar.

What is claimed is:

1. An apparatus for reading bar code data comprising:
    a memory apparatus,
    a data input circuit means for inputting scanned bar code data in said memory apparatus,
    a write address generator means for sequentially generating an address for writing said bar code data in said memory apparatus in response to a signal outputted when a transition occurs between a white bar and a black bar, in accordance with a scan of said bar code data, and
    a detecting circuit means for reading a guard bar on the right edge of a right bar code block in a first bar code so that, when the data of the scanned bar code read from the first bar code side to a second bar code side is provided, an address output from said write address generator means in response to an output of said detecting circuit is used for an access of data of a second bar code stored in said memory apparatus.

2. The apparatus for reading bar code data according to claim 1,
    further comprising a counter means for counting a signal output when a transition occurs between a white bar and a black bar in accordance with a scanning of the second bar code and producing a signal for completing the reading of the bar code when the number in the counter reaches a predetermined value corresponding to the total number of white bars and black bars of the second bar code.

3. The apparatus for reading a bar code according to claim 1, wherein
    said second bar code does not have a center bar or a guard bar and comprises only a character bar.

4. An apparatus for reading bar code data comprising:
    a bar code label comprising
    a first bar code having a center bar between left and right bar code blocks and having a guard bar on the left edge of said left bar code black and on the right edge of said right bar code block, and
    a second bar code provided next to a guard bar attached to the right edge of said right bar code block and different from the bar code system of said first bar code,
    means for scanning the bar code label from the first bar code side to the second bar code side,
    means for sequentially storing the data of the bar code which is read out upon scanning,
    means for recognizing the guard bar on the right edge of said right bar code block during storing of the data read from said bar code, and
    means for using one address for storing the right edge guard bar of said right bar code block for access to stored data of said second bar code.

5. The apparatus for reading a bar code according to claim 4, wherein
    said second bar code does not have a center bar or a guard bar and comprises only a character bar.

6. An apparatus for reading bar code data comprising:
    a memory apparatus,
    a data input circuit for inputting scanned bar code data in the memory apparatus,
    a write address generator means for sequentially generating an address for writing said bar code data in said memory apparatus in response to a signal outputted when a transition occurs between a white bar and a black bar, in accordance with a scan of said bar code data,
    first detecting circuit means for detecting a reading of a center bar of a first bar code when said scanned data red from a second bar code side to a first bar code side is provided, and
    a second detecting circuit means for reading a guard bar on the right edge of a right bar code block in said first bar code so that, when the bar code data read from the first bar code side to with second bar code side is provided, an address output from said write address generator means in response to the output of said second detecting circuit means is used for an access of data of the second bar code stored in said memory apparatus.

7. The apparatus for reading bar code data according to claim 6,
    further comprising means for obtaining an address by subtracting an address value of the right code block of the first bar code from the address output from the write address generator means in response to the output of the detecting circuit, said obtained address being used for the final address.

8. An apparatus for reading bar code data comprising:
    a bar code label comprising
    a first bar code having a center bar between left and right bar code blocks and having a guard bar on the left edge of said left bar code block and on the right edge of said right bar code block, a second bar code provided next to a guard bar attached to the right edge of said right bar code block and different from the bar code of said first bar code, means for scanning the bar code label from said second bar code side to said first bar code side, means for sequentially storing the data of said bar code read out by the scanning, means for recognizing a center bar appearing during storing of the data of said bar code, and means for using an address for storing the data of the center bar upon recognition as an access to stored data of said second bar code.

9. An apparatus for reading bar code data comprising:
a memory apparatus,
a data input circuit means for inputting scanned bar code data in said memory apparatus,
a write address generator means for sequentially generating an address for writing said bar code data in said memory apparatus in response to a signal outputted when a transition occurs between a white bar and a black bar, in accordance with a scan of said bar code data, and
a detecting circuit means for detecting a reading of a guard bar on the right edge of a right bar code block within a first bar code so that, when data of the bar code read from the first bar code side to a second bar code side is provided on the right side of the first bar code and is different from the first bar code in bar code system, an address output from said write generator means in response to an output of said detecting circuit means signal is used to access the data of a second bar code stored in said memory apparatus.

10. An apparatus for reading bar code data comprising:
a memory apparatus,
a data input circuit means for inputting scanned bar code data in said memory apparatus,
a write address generator means for sequentially generating an address for writing said bar code data in said memory apparatus in response to a signal outputted when a transition occurs between a white bar and a black bar, in accordance with a scan of said bar code data, and
a detecting circuit means for judging whether the scanning upon reading of said bar code data is performed from a first bar code side to a second bar code side, which second bar code is provided on the right side of the first bar code and is different from the first bar code in bar code system, or the scanning upon reading of said bar code data is performed from the second bar code side to the first bar code side, detecting the reading of a guard bar on the right side of a right bar code block within the first bar code to output a guard bar recognition signal in the former case and detecting the reading of the center bar of the first bar code to output a center bar recognition signal in the latter case, wherein the address output from said write address generator means in response to the output of said detecting circuit means is used to access data of a second bar code stored in said memory apparatus.

11. An apparatus for reading bar code data comprising:
a memory apparatus,
a data input circuit means for inputting scanned bar code data in said memory apparatus,
a write address generator means for sequentially generating an address for writing said bar code data in said memory apparatus in response to a signal outputted when a transition occurs between a white bar and a black bar, in accordance with a scan of said bar code data,
a detecting circuit means for judging whether the scanning upon the reading of the bar code data is performed from a first bar code side to a second bar code side, which second bar code is provided on the right side of the first bar code and is different from the first bar code in bar code system, or scanning upon reading the bar code data is performed from the second bar code side to the first bar code side, detecting the reading of a guard bar on the right side of a right bar code block within the first bar code and to output a guard bar recognition signal in the former case, and detecting of the reading of a center bar of the first bar code to output a center bar recognition signal in the latter case, wherein the address output from said write address generator means in response to an output of said detecting circuit means is used to access data of a second bar code stored in said memory apparatus, and
a latch circuit means for latching the address output from said write address generator means in response to the output of said detecting circuit, wherein the address latched in said latch circuit is used to access the second bar code data stored in the memory apparatus.

* * * * *